UNITED STATES PATENT OFFICE.

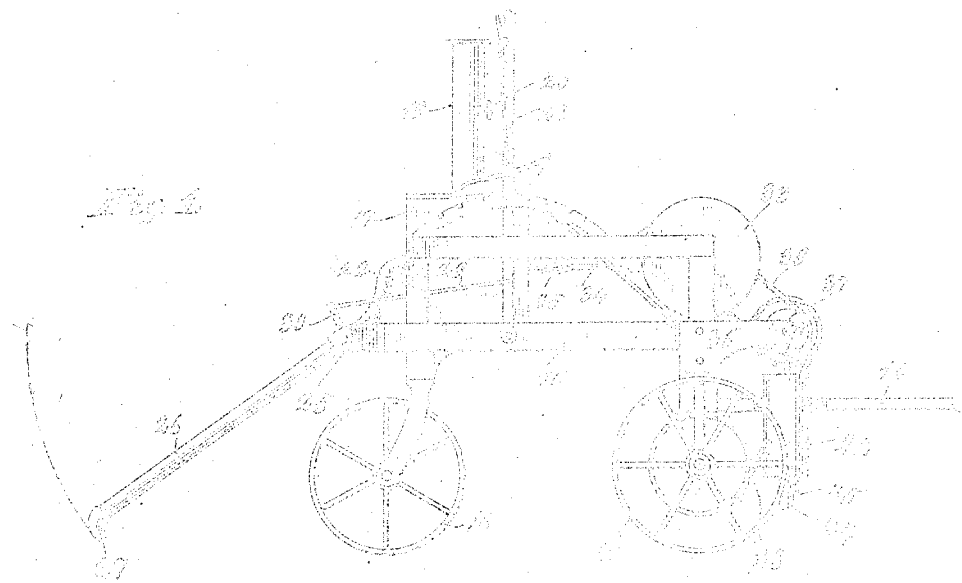

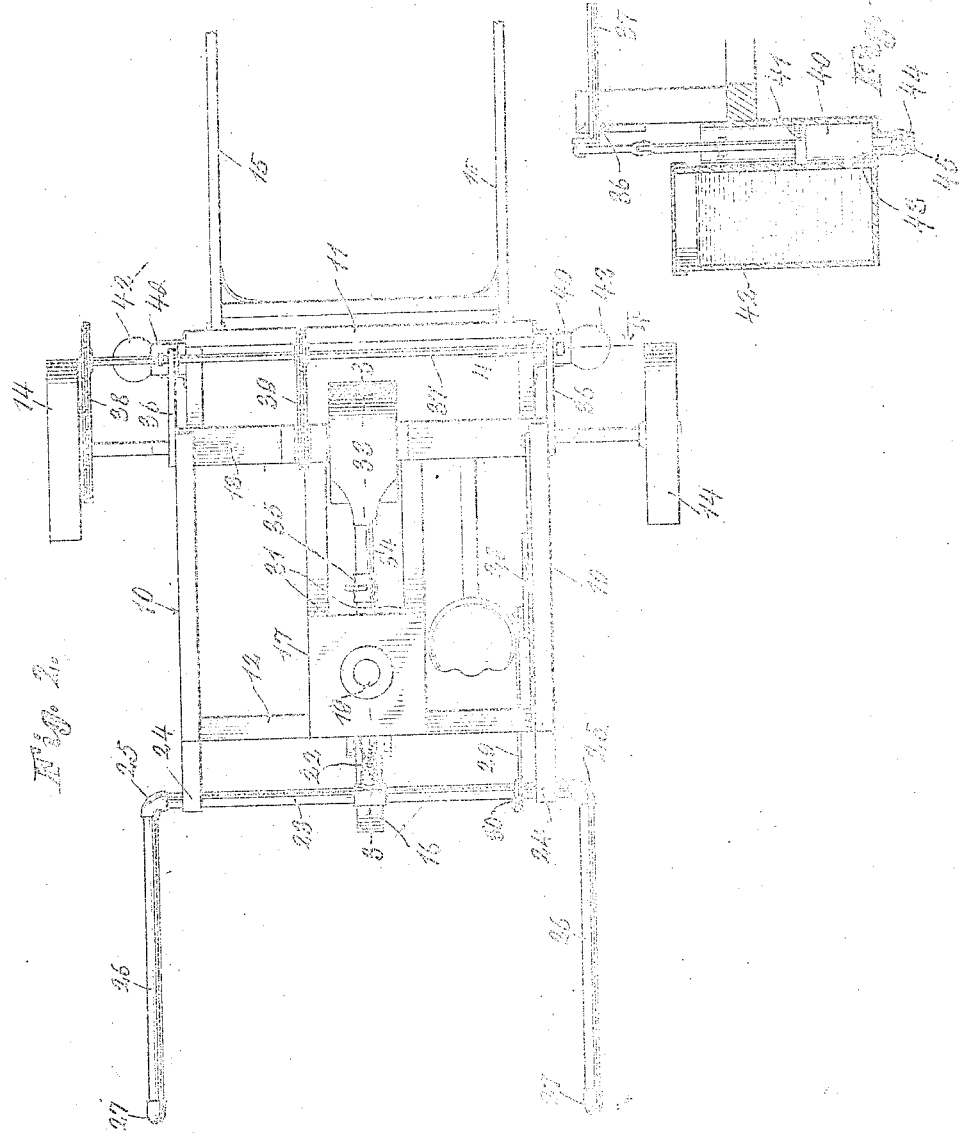

JAMES LICURGIS COLDIRON, OF EASTLAND, TEXAS, ASSIGNOR OF ONE-FOURTH TO JOHN P. MARTIN, ONE-FOURTH TO DRUSSIE S. HOLLAND, AND ONE-FOURTH TO LEE C. DOWNTAIN, ALL OF EASTLAND, TEXAS.

INSECT-DESTROYER.

1,090,260. Specification of Letters Patent. Patented Mar. 17, 1914.

Application filed April 27, 1912. Serial No. 693,759.

*To all whom it may concern:*

Be it known that I, JAMES L. COLDIRON, a citizen of the United States, residing at Eastland, in the county of Eastland and State of Texas, have invented certain new and useful Improvements in Insect-Destroyers, of which the following is a specification.

The apparatus which is the subject of the present invention is designed for fumigating cotton and other plants to destroy the insects thereon, and its object is to provide a simple and efficient apparatus of the kind, the same comprising a truck carrying a furnace for producing smoke and means for blowing the smoke onto the plants.

The invention also has for its object to provide a novel and improved smoke-conveyer pipe which is adjustable so that the plants of different heights may be reached.

Other objects and advantages of the invention will be pointed out in the detailed description appearing hereinafter.

In order that the invention may be better understood, reference is had to the accompanying drawings forming a part of this specification in which drawings, Figure 1 is a side elevation of the apparatus; Fig. 2 is a plan view thereof; Figs. 3 and 4 are sections on the lines 3—3 and 4—4, respectively of Fig. 2.

Referring specifically to the drawings, the apparatus is mounted on a truck, the frame of which consists of longitudinal side bars 10 connected by front and rear cross-bars 11 and 12, respectively, and an intermediate cross-bar 13. The frame is mounted at its forward end on two wheels 14, and to said end are attached shafts 15 for the draft animal. The rear end of the frame is supported on a single wheel 16.

The truck-frame carries at its rear end a smoke-generator comprising a fire-box 17 containing a grate 18, and provided with a smoke outlet 19 which is controlled by a damper 20. The fire-box has a second smoke outlet 21 to which is connected a flexible tube 22 which extends downward and is coupled to a pipe 23 extending across the rear end of the truck-frame, and supported in bearings 24 carried by the rear ends of the side-bars 10, said pipe being free to turn or rock in said bearings, for a purpose to be presently described. To each end of the pipe 23 is connected by means of an elbow 25, a rearwardly extending pipe 26 fitted with a discharge nozzle 27 at its outer end. One of the side-bars 10 carries a hand-lever 28 which is connected by a link 29 to a rocker arm 30 on the pipe 23, whereby the latter may be rocked in its bearings 24. When the pipe 23 is rocked, the pipes 26 swing in a vertical plane and the nozzles 27 are therefore adjusted vertically according to the height of the plants to be treated.

The top of the fire-box 17 is hinged as indicated at 31 so that it may be swung open for the introduction of fuel, and below the grate 18 is an ash-door 32. A natural draft is thus capable of being created through the furnace by means of the door 32 and the outlet pipe 19, this draft being regulated by the valve 20 within the outlet pipe. Thus it will be seen that the furnace has two drafts, one above the fire which carries off the fumes to the outlet pipe, and the other through the fire to aid in the combustion of the fuel and the fumigating materials. By this means it is possible to regulate the mixture of the gases and air so as to make fumigating gas stronger or weaker at will. The truck-frame also carries a fan blower 33, to the outlet of which is connected a pipe 34 which discharges into the fire-box 17, above the grate 18. In the pipe 34 is a valve 35 for controlling the blast.

The fan is driven from one of the wheels 14 through the following gearing: On the forward end of the truck-frame are bearings 36 in which is journaled a shaft 37 which extends transversely of the truck-frame, and is driven from one of the wheels 14 by a suitable sprocket-and-chain gearing 38. The shaft of the fan blower 33 is driven from the shaft 37 by a sprocket-and-chain gearing 39.

In order that the apparatus may also be employed for spraying the plants, there is mounted on each side of the truck-frame, at the front thereof, a spray-pump 40, the plunger 41 of which is operatively connected to the shaft 37 and driven thereby. The pump-cylinder extends vertically and on the side thereof is mounted a reservoir 42 for the insecticide, said reservoir having an outlet into the pump-cylinder, which outlet is provided with a check-valve 43. On the bottom of the pump-cylinder is an outlet nozzle 44 provided with a suitable controlling valve 45.

In operation, the fire-box 17 being charged with a suitable smoke producing fuel, the truck is driven across the field, whereupon the fan blows the smoke from the fire-box through the outlet 21 and into the pipe 23, which latter conducts the smoke into the pipes 26. The pipe 23 having been adjusted to place the nozzles 27 in proper position with respect to the plants, the smoke is discharged through the nozzles 27 onto the plants, thereby destroying all insect life thereon. Two rows of plants are operated on simultaneously. If the plants are to be sprayed also, the pumps 40 are thrown into operation.

I claim:

In a fumigator of the class described, a generator comprising a casing provided with a grate, said casing being provided with an inlet opening and a diametrically directed outlet opening spaced above said grate, said inlet and outlet openings being in axial alinement, and means to force air into said inlet opening whereby a stream of air will be directed diametrically across the material on the grate, said casing being further provided with an inlet opening beneath said grate, and a damper-controlled opening extending from the top of the casing whereby natural draft may be effected and the mixture of air and gases regulated.

In testimony whereof I affix my signature in presence of two witnesses.

JAMES LICURGIS COLDIRON.

Witnesses:
T. L. OVERBEY,
T. E. DAY.